United States Patent
Bendet

(10) Patent No.: US 11,468,249 B2
(45) Date of Patent: Oct. 11, 2022

(54) LINKING AN ENTITY RELATING TO PRODUCT DEVELOPMENT TO A DOCUMENT PORTION

(71) Applicant: HEWLETT PACKARD ENTERPRISE DEVELOPMENT LP, Houston, TX (US)

(72) Inventor: Ori Bendet, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 799 days.

(21) Appl. No.: 15/515,218

(22) PCT Filed: Nov. 17, 2014

(86) PCT No.: PCT/US2014/065916
§ 371 (c)(1),
(2) Date: Mar. 29, 2017

(87) PCT Pub. No.: WO2016/080948
PCT Pub. Date: May 26, 2016

(65) Prior Publication Data
US 2017/0228564 A1    Aug. 10, 2017

(51) Int. Cl.
*G06F 3/00*   (2006.01)
*G06F 9/00*   (2006.01)
*G06F 17/00*  (2019.01)
*G06K 3/02*   (2006.01)
*G06F 16/93*  (2019.01)
(Continued)

(52) U.S. Cl.
CPC ............... *G06K 3/02* (2013.01); *G06F 3/048* (2013.01); *G06F 3/0481* (2013.01); *G06F 16/93* (2019.01); *G06F 16/94* (2019.01); *G06F 17/40* (2013.01); *G06F 40/10* (2020.01); *G06F 40/134* (2020.01); *G06F 40/137* (2020.01); *G06F 21/10* (2013.01)

(58) Field of Classification Search
CPC ........... G06K 3/02; G06F 16/94; G06F 16/93; G06F 3/0481; G06F 17/40; G06F 3/048; G06F 17/21; G06F 17/2235; G06F 17/2241; G06F 21/10
See application file for complete search history.

(56) References Cited

U.S. PATENT DOCUMENTS 6,377,956 B1   4/2002  Hsu et al.
8,103,701 B2   1/2012  Brimble et al.
(Continued)

FOREIGN PATENT DOCUMENTS

JP     2012247916 A    12/2012

OTHER PUBLICATIONS

Chappell, D., "What is Application Lifecycle Management?" Sponsored by Microsoft Corporation, Dec. 2008, 6 pages.
(Continued)

*Primary Examiner* — Kieu D Vu
*Assistant Examiner* — Anita D Chaudhuri

(57) ABSTRACT

A hierarchical representation of entities relate to development of at least one product. A portion of a document is selected. For the selected portion of the document, an indication associated with at least one of the entities in the hierarchical representation is received. Based on the received indication, a link is created between the selected portion of the document and the at least one of the entities in the hierarchical representation.

20 Claims, 8 Drawing Sheets

(51) Int. Cl.
*G06F 40/10* (2020.01)
*G06F 40/134* (2020.01)
*G06F 40/137* (2020.01)
*G06F 3/048* (2013.01)
*G06F 3/0481* (2022.01)
*G06F 17/40* (2006.01)
*G06F 21/10* (2013.01)

(56) References Cited

U.S. PATENT DOCUMENTS

| | | |
|---|---|---|
| 8,196,100 B2 | 6/2012 | Petri |
| 2002/0029231 A1 | 3/2002 | Aptus et al. |
| 2002/0055922 A1 | 5/2002 | Minowa et al. |
| 2002/0091990 A1* | 7/2002 | Little ............... G06F 8/10 717/105 |
| 2006/0271913 A1 | 11/2006 | Erf |
| 2008/0250394 A1 | 10/2008 | Jones et al. |
| 2008/0300946 A1* | 12/2008 | Clark .............. G06Q 10/06 705/7.12 |
| 2010/0280883 A1* | 11/2010 | Ioannou ........... G06Q 10/06 705/7.15 |
| 2010/0287464 A1 | 11/2010 | Grigoriadis et al. |

OTHER PUBLICATIONS

Hewlett-Packard Development Company, L.P., "HP Application Lifecycle Intelligence," For the HP ALM Platform, Software Version: 2.0, User Guide, Oct. 2012, 49 pages.

Hewlett-Packard Development Company, L.P., "HP Application Lifecycle Management," Software Version: 11.00, Tutorial, Nov. 2010, 194 pages.

Hewlett-Packard Development Company, L.P., "Quantifying the value of investments in HP Application Lifecycle Management Solutions," White paper, Jan. 2010, 12 pages.

Hewlett-Packard Development Company, L.P., "Shorten Release Cycles By Bringing Developers to Application Lifecycle Management," Business white paper for application team professionals, Oct. 2011, 8 pages.

International Search Report & Written Opinion received in PCT Application No. PCT/US2014/065916, dated Jun. 29, 2015, 12 pages.

Oorja Software, "File & Folder Comparison and Synchronization," (Web Page), copyright 2006-2013, 4 pages, available at http://www.oorjasoftware.com/product_info.html.

* cited by examiner

LINKING AN ENTITY RELATING TO PRODUCT DEVELOPMENT TO A DOCUMENT PORTION

BACKGROUND

An enterprise can develop a product that can be sold to customers or that can be for internal use by the enterprise. As part of the development of the product, documents can be created. Such documents can provide a description of various aspects of the product under development.

BRIEF DESCRIPTION OF THE DRAWINGS

Some implementations are described with respect to the following figures.

DETAILED DESCRIPTION

Figure 1:
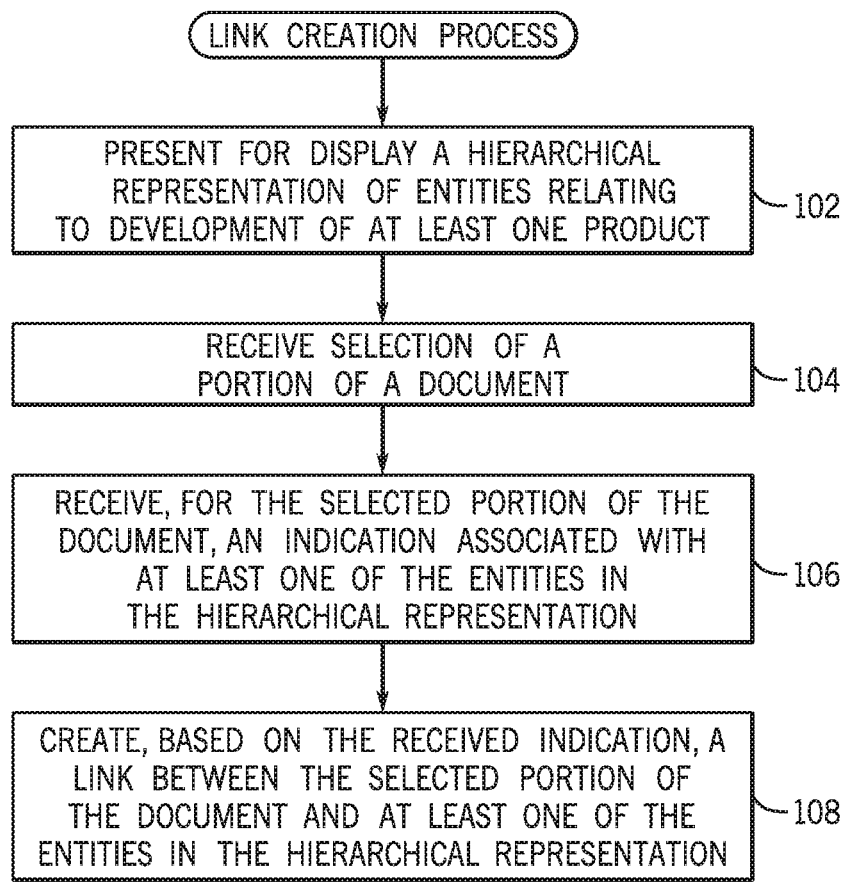
FIG. 1 is a flow diagram of an example link creation process according to some implementations.

Development of a product can include several phases, including an initial phase in which a design of the product is being defined, a build phase in which the product is created or built, a test phase to test the product, a tracking phase to track any faults or defects of the product, and so forth. Examples of products include program code (machine-readable instructions), a computer, an appliance, a vehicle, or any other type of tangible or physical product that can be provided by an enterprise (e.g. business concern, educational organization, government agency, etc.) to customers, or that can be used internally at the enterprise.

Examples of program code that can be developed include the following: application software, firmware, operating system code, virtualization code for virtualizing a system, code for a web service or any other type of service, or any other type of machine-readable instructions.

In some implementations, the phases associated with development of a product can include phases of Application Lifecycle Management (ALM). ALM defines several phases associated with developing a product, including a phase for defining a release of a product, a phase for specifying requirements (or specifications) of features of the product and of other aspects of product development, a phase for integration of the product (e.g. integration into a larger system), a phase for planning tests, a phase for executing the tests on the product, a phase for tracking defects, and so forth. Although reference is made to ALM in some examples, it is noted that techniques or mechanisms according to some implementations can be applied in other contexts.

As a product is being developed, documents can be created that relate to the product. For example, the documents can include a specification document that includes an explanation of features and functions of the product, a user's manual that explains to users how to use the product, a test guide describing how tests can be performed, an installation guide describing how a product can be installed for use, a design document that graphically depicts aspects of the product, a model that provides a mockup of the product, and so forth. More generally, a "document" can refer to any representation that contains information that is presentable (e.g. can be displayed, can be output as audio, etc.) to a user or users.

In some cases, the development of a product (or products) and the creation of documents are performed using distinct tools. For example, the development of a product (or products) can be performed using product development tools, including an ALM tool or other type of tool. The creation of documents can be performed using authoring tools, such as a word processing application, a spreadsheet application, and so forth.

A link may not be provided between product development and document creation. As a result, when some aspect of product development is modified, there is no easy way to determine how the modification relates to any document. As a result, a document may not be up-to-date with changes made in the product development, which can lead to inaccurate information being released in documents.

In accordance with some implementations, techniques or mechanisms are provided to allow creation of a link between entities relating to product development and documents (or portions of documents). An "entity" relating to a development of a product can include information and/or program code associated with any aspect of product development. In the ensuing disclosure, although reference is made to development of a product in the singular sense, it is noted that techniques or mechanisms can also be applied in the context of development of multiple products.

As noted above, one of the phases of product development can include defining requirements for the product. Requirements can include entities relating to tasks to be performed, goals to be achieved, or other features to be provided to meet objectives of a product under development. For example, requirements can include a parameter handling entity that specifies how parameters of the product are to be handled or managed, a scheduling entity that specifies scheduling in the development of the product, an integration entity that that relates to how the product is to be integrated into a larger system, and so forth. An entity for a specific requirement can generally refer to any collection of information and/or program code that pertains or governs the requirement.

Another example of an entity relating to product development can include an entity representing defects of the product. A further example of an entity relating to product development can include a scheduling entity for scheduling tasks to be performed.

In some implementations, the entities relating to product development can be hierarchical in nature. For example a requirements entity can include several sub-entities that represent specific types of requirements. For example, the sub-entities can be used to track the different types of requirements.

As another example, a parameter handling entity can include sub-entities that relate to handling specific types of parameters.

The entities can be represented using a hierarchical representation, such as in the form of a tree in which higher-level entities are at one level, while lower-level entities are at other level(s).

FIG. 1 is a flow diagram of a link creation process according to some implementations. The process presents (at 102) for display a hierarchical representation of entities relating to development of at least one product. Presenting the hierarchical representation for display can refer to causing display of the hierarchical representation to a user, for example.

The process receives (at 104) selection of a portion of a document that is displayed. In addition, the process receives (at 106), for the selected portion of the document, an indication associated with at least one of the entities in the hierarchical representation. The process creates (at 108), based on the received indication, a link between the selected portion of the document and at least one of the entities in the hierarchical representation.

A link between a document portion and an entity relating to development of at least one product can refer to an indicator (e.g. a data item, a graphical element, etc.) that specifies that a relationship exists between the document portion and the entity. The link can be in a form that can be stored in a data structure for subsequent retrieval by a user, a machine, or program code.

Figure 2:
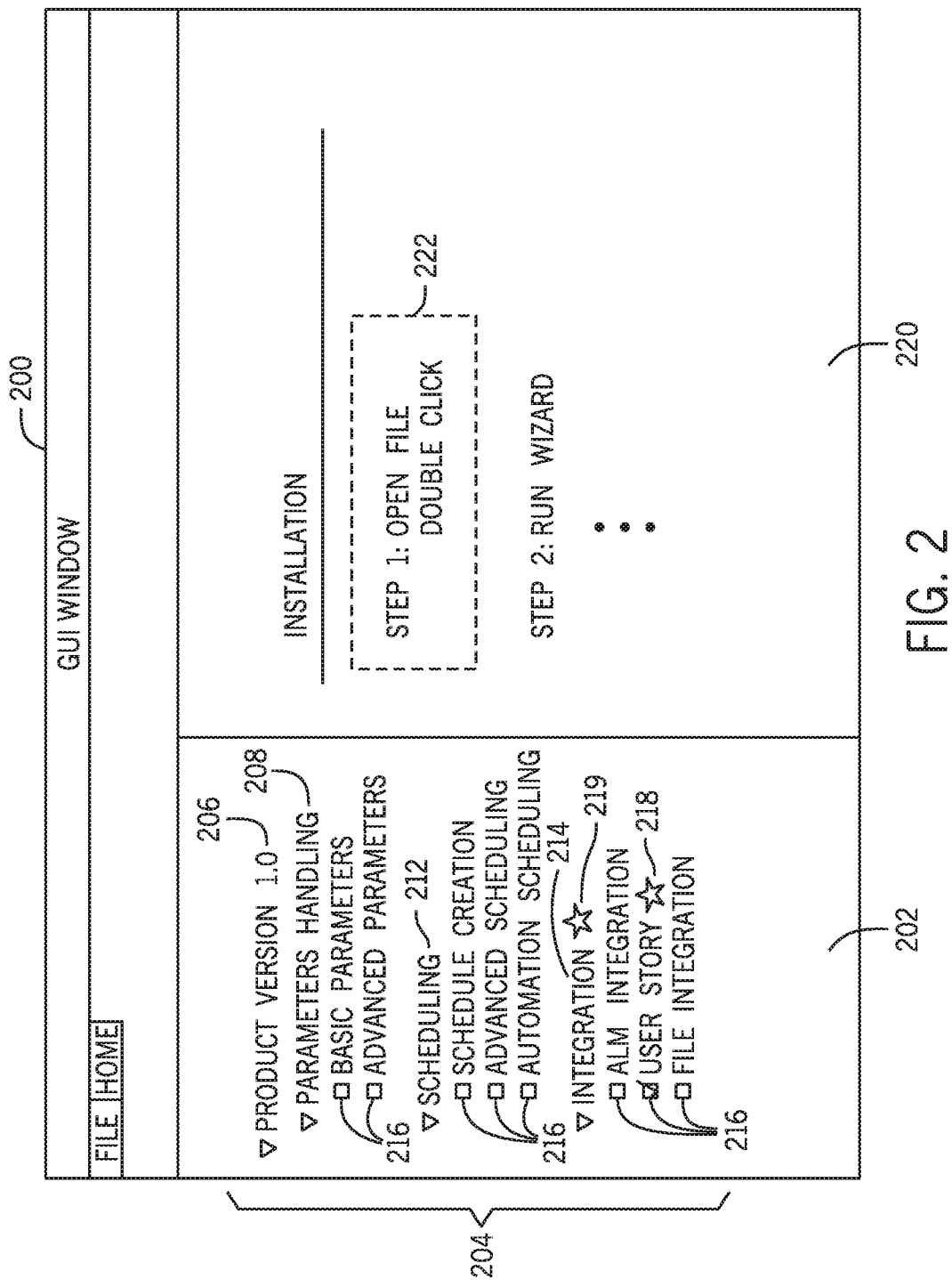
FIG. 2 is a schematic view of an example graphical user interface (GUI) window according to some implementations.

FIG. 2 shows an example graphical user interface (GUI) window 200 that can be presented for display on a display device. In the example of FIG. 2, the GUI window 200 includes a screen area 202 that includes GUI items representing entities of an example hierarchical representation for a product under development (e.g. "Product Version 1.0"). The entities of the hierarchical representation are represented in a hierarchical format, such as in the form of a tree 204 in the example of FIG. 2.

In the displayed tree 204 of GUI items, the highest-level GUI item (root item 206) can represent a highest-level entity of the hierarchical representation. For example, the root item 206 can represent the product under development ("Product Version 1.0"), Under the root item 206 are additional GUI items at a second hierarchical level, including a Parameters Handling item 208 (which represents an entity for handling of parameters), a Scheduling item 212 (which represents an entity for scheduling tasks for the product under development), and an Integration item 214 (which represents an entity for integration of the product under development).

At a third, lower hierarchical level, additional GUI sub-items representing respective sub-entities can be presented, including sub-entities of a parameters handling entity (represented by the GUI item 208), sub-entities of a scheduling entity (represented by the GUI item 212), and sub-entities of an integration entity (represented by the GUI item 214).

Although three hierarchical levels are represented by the tree 204 in FIG. 2, it is noted that in other examples, the tree 204 can have a smaller number or larger number of hierarchical levels to represent other arrangements of hierarchical representations of entities relating to product development.

As further shown in FIG. 2, each of the GUI sub-items in the tree 204 is associated with a corresponding selectable box (or other type of selectable element) 216 that can be user-selectable. Note that although reference is made to user selection of the GUI items that represent entities of the hierarchical representation, it is noted that in other examples, the selection of the entities of the hierarchical representation can be performed by a machine or by program code (in the form of machine-executable instructions).

The GUI window 200 of FIG. 2 also includes a document display area 220 for displaying at least a portion of a document. In the example shown in FIG. 2, the text of an Installation document is shown. As further shown in FIG. 2, a portion 222 (including text) of the Installation document is highlighted, such as in response to selection made by user input, or in response to input from a machine or program code. The selecting of the portion 222 of the Installation document may have been performed to link the selected portion 222 to one of the entities represented by the items in the entity tree 204. In the example shown in FIG. 2, the selectable box 216 associated with a User Story GUI item has been selected (indicated with a check mark or other indicator). The User Story GUI item represents a user story entity of the hierarchical representation, where the user story entity can refer to an entity that captures a description of a product from an end user's perspective.

Selection of the selectable box 216 associated with the User Story GUI item can also cause a marker 218 to be added adjacent to the User Story GUI item. Also, another marker 219 can be added adjacent the parent GUI item (Integration item).

In other examples, the markers 218 and 219 can be omitted.

The selection of the selectable box 216 associated with the User Story GUI item causes a link to be created between the user story entity and the selected portion 222 of the Installation document. Note that multiple selectable boxes 216 associated with respective different GUI items can be selected, in which case links between the entities represented by the selected GUI items and the selected portion 222 of the Installation document can be created.

In other examples, selecting of a portion of the Installation document is not performed. In such examples, upon selection of a selectable box 216 associated with a given GUI item in the tree 204, a link between the entity represented by the selected GUI item and the entire Installation document is created.

Figure 3:
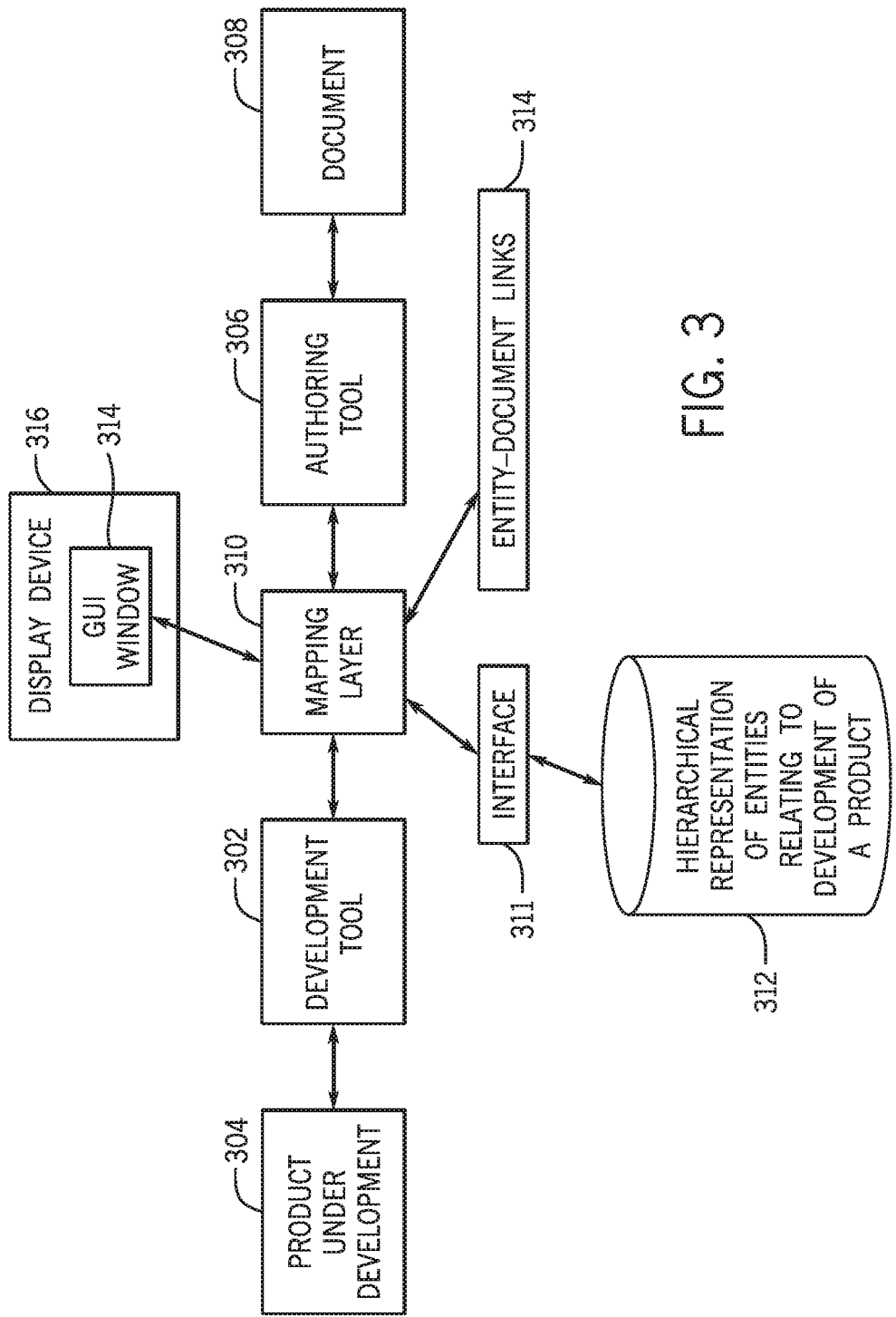
FIG. 3 is a schematic diagram of an example arrangement including a mapping layer according to some implementations.

FIG. 3 is a schematic diagram of an example arrangement in accordance with some implementations. A development tool 302 (which can include a program code, a machine, or a combination of a program code and a machine) can be used for developing a product 304 (or multiple products). One example of the development tool 302 includes an ALM tool. In other examples, other types of development tools can be employed.

In addition, an authoring tool 306 (which can include a program code, a machine, or a combination of a program code and a machine) can be used to produce a document 308 (or multiple documents). Examples of authoring tools can include a word processing application, a spreadsheet application, and so forth.

To allow for linking between entities relating to development of the product 304 and the document 308, a mapping layer 310 (which can perform tasks of FIG. 1, for example) can be provided between the development tool 302 and the authoring tool 306. In some examples, the mapping layer 310 can include plug-in code, which is code (machine-readable instructions) that can be added onto other code to add functionality to the other code. The plug-in code can be added on to the authoring tool 306 and/or the development tool 302.

As further shown in FIG. 3, the mapping layer 310 can access a hierarchical representation 312 of entities relating to development of the product 304. In some examples, an interface 311 is provided between the mapping layer 310 and the hierarchical representation 312 of entities. This interface 311 can be an application programming interface (API). The API defines one or multiple routines that can be invoked by the mapping layer 310 to access content of the hierarchical representation 312. In other examples, other types of interfaces can be employed between the mapping layer 310 and the hierarchical representation 312 of entities.

In addition, the mapping layer 310 can present, for display, a GUI window 314 (e.g. the GUI window 200 of FIG. 2) in a display device 316. The GUI window 314 can be used to display GUI items representing entities of the hierarchical representation 312 and to display at least a portion of the document 308 (such as according to FIG. 2).

Any link created between an entity of the hierarchical representation 312 and the document 308 (or portion of the document 308) can be stored in a file or other data structure 314 (FIG. 2) that stores entity-document links between entities of the hierarchical representation 312 and respective documents (or document portions) created by the authoring tool 306.

Figure 4:
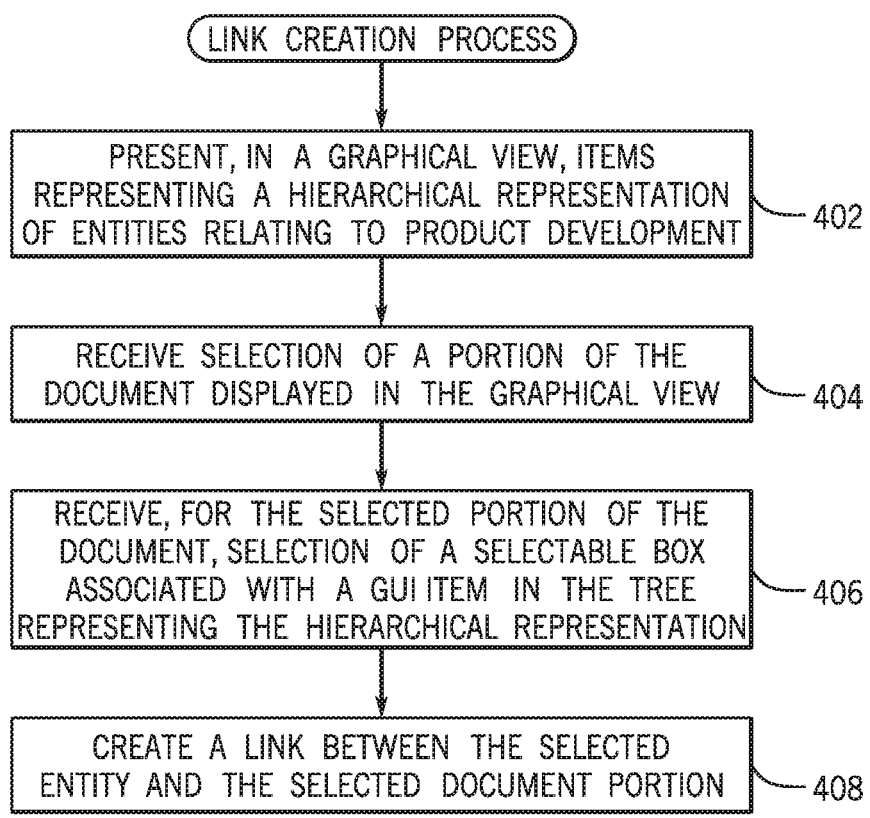
FIG. 4 is a flow diagram of an example link creation process according to further implementations.

FIG. 4 is a flow diagram of an example link creation process according to further implementations, which can be performed by the mapping layer 310 of FIG. 3, for example. The process of FIG. 4 presents (at 402), in a graphical view (such as the GUI window 200 or 314 of FIG. 2 or 3, respectively), items representing the hierarchical representation 312 of entities. The process of FIG. 4 also receives (at 404) selection of a portion of a document displayed in the graphical view. In some examples, the items representing the hierarchical representation can be in the form of a tree, such as tree 204 in FIG. 2, of GUI items.

The process receives (at 406) selection of a selectable box associated with a GUI item in the tree representing the hierarchical representation 312 of entities in the graphical view. The selected GUI item corresponds to a selected entity of the hierarchical representation.

In response to the received selection at 406, the process of FIG. 4 creates (at 408) a link between the selected entity and the respective selected document portion. If selection of a portion of the document is not received (at 404), then the link created can be between the selected entity and the entire document.

In accordance with some implementations, in addition to being able to create links between entities associated with developments of a product and documents or document portions, the mapping layer 310 of FIG. 3 is also able to generate an alert in response to a change in an entity associated with development of a product, or in response to a change in a document. An alert can refer to any notification that can be provided to a user, a machine, or program code for indicating that a change to an entity associated with product development has affected a document (or document portion). Alternatively, the alert can provide a notification that a change to a document (or document portion) has affected an entity associated with product development.

Figure 5:
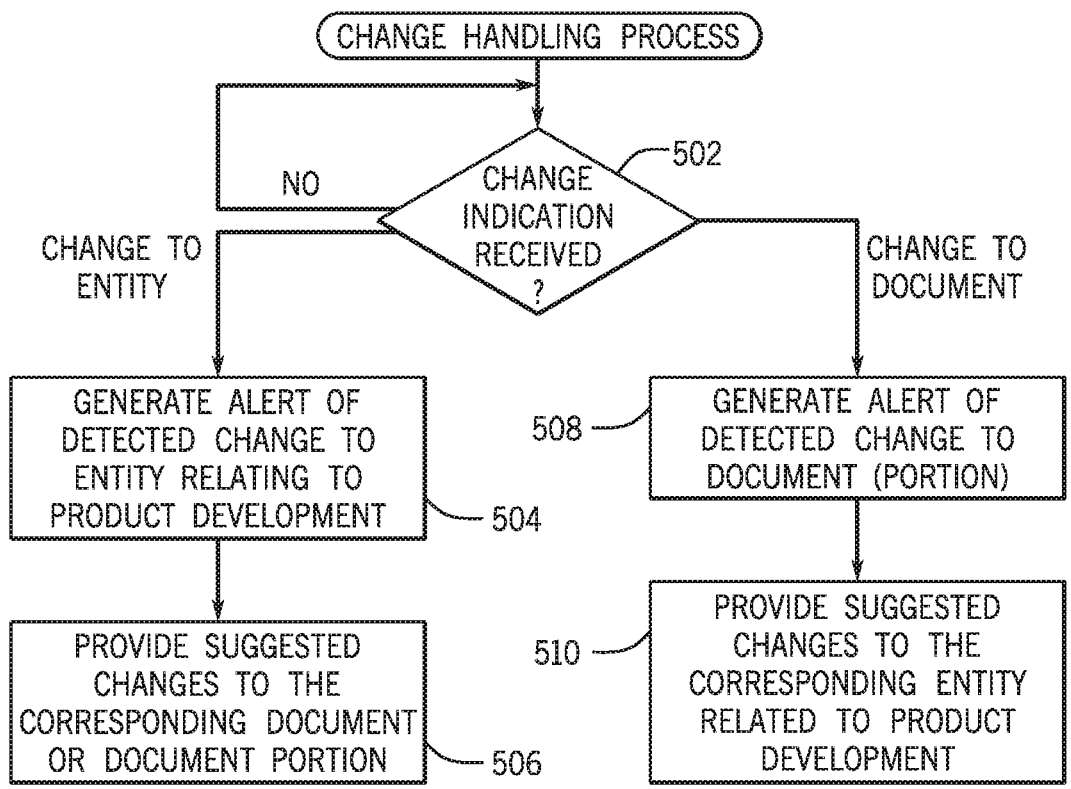
FIG. 5 is a flow diagram of an example change handling process according to some implementations.

FIG. 5 is a flow diagram of a change handling process according to some implementations, which can be performed by the mapping layer 310 of FIG. 3, for example. The change handling process determines (at 502) if an indication that a change has occurred has been received, where the change can be a change to an entity relating to product development, or alternatively, a change to a document.

If the detected change is to an entity relating to product development, then the change handling process generates (at 504) an alert of the detected change to the entity relating to product development. The alert can be sent to a target user, a target machine, or a target program code. The alert can identify which document or which document portion is affected by the change to the entity relating to product development. The identifying of the affected document or document portion can be based on accessing the entity-document links contained in the data structure 314 of FIG. 3, for example. The entity-document links allow for correlation between the modified entity and the corresponding document (portion) that is affected.

In addition, the change handling process can provide (at 506) suggested changes to the corresponding document or document portion. In some cases, the change handling process can even automatically update the corresponding document or document portion for the detected change to the entity relating to product development.

If the determination at 502 detects that a change to a document or document portion has occurred, then the change handling process generates (at 508) an alert of the detected change to the document (portion). The alert can identify which entity relating to product development is affected by the detected change to the document (portion). The identifying of the affected entity can be based on accessing the entity-document links contained in the data structure 314 of FIG. 3, for example.

The change handling process can also provide (at 510) suggested changes to the corresponding entity related to product development. In some cases, the change handling process can even automatically update the corresponding entity related to product development for the detected change to the document (portion).

By being able to make corresponding changes in entities related to product development or documents based on detected changes, more accurate deliverables can be provided by an enterprise to customers. For example, the documents that are provided to customers in association with deliveries of products can be documents that are up-to-date with the latest revisions of the delivered products.

Figure 6:
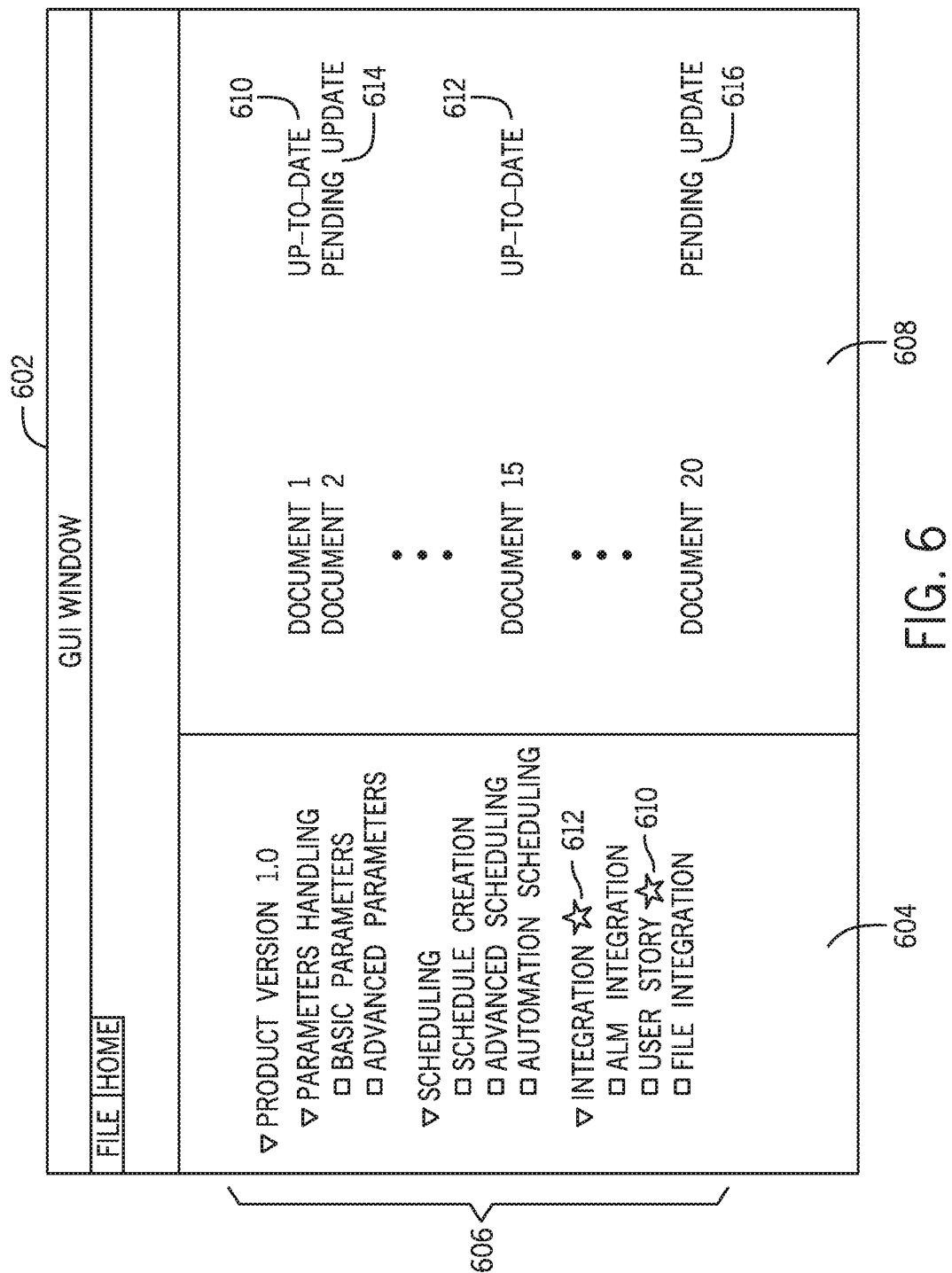
FIGS. 6 and 7 are schematic views of example GUI windows according to some implementations.

FIG. 6 shows an example GUI window 602 that can be presented by the mapping layer 310 of FIG. 3 (such as in the display device 316 of FIG. 3). The GUI window 602 includes a display area 604 to display a tree 606 (similar to the tree 204 shown in FIG. 2), and a document list display area 608 that lists various documents (e.g. document 1, document 2, document 15, . . . , document 20 shown in FIG. 6). In the example of FIG. 6, it is assumed that a user story entity has been modified, which is indicated with a marker 610 adjacent the User Story item. In some examples, another marker 612 can also be added adjacent the Integration item that is the parent of the User Story item. The marker 612 indicates that an entity represented by a child item of the Integration item has been modified.

The document list display area 608 can provide an indication for each document in the displayed document list that is affected by the change to the user story entity. In the example of FIG. 6, two documents (document 2 and document 20) are affected, which are each marked with a "Pending Update" indication (614, 616).

Note that the other documents (not affected by the change to the user story entity) in the document list are marked with a different indication, such as an "Up-To-Date" indication (610, 612).

A user can select a document marked with the "Pending Update" indication (614 or 616) to make corresponding changes to the document in response to the indicated change to the user story entity.

Figure 7:
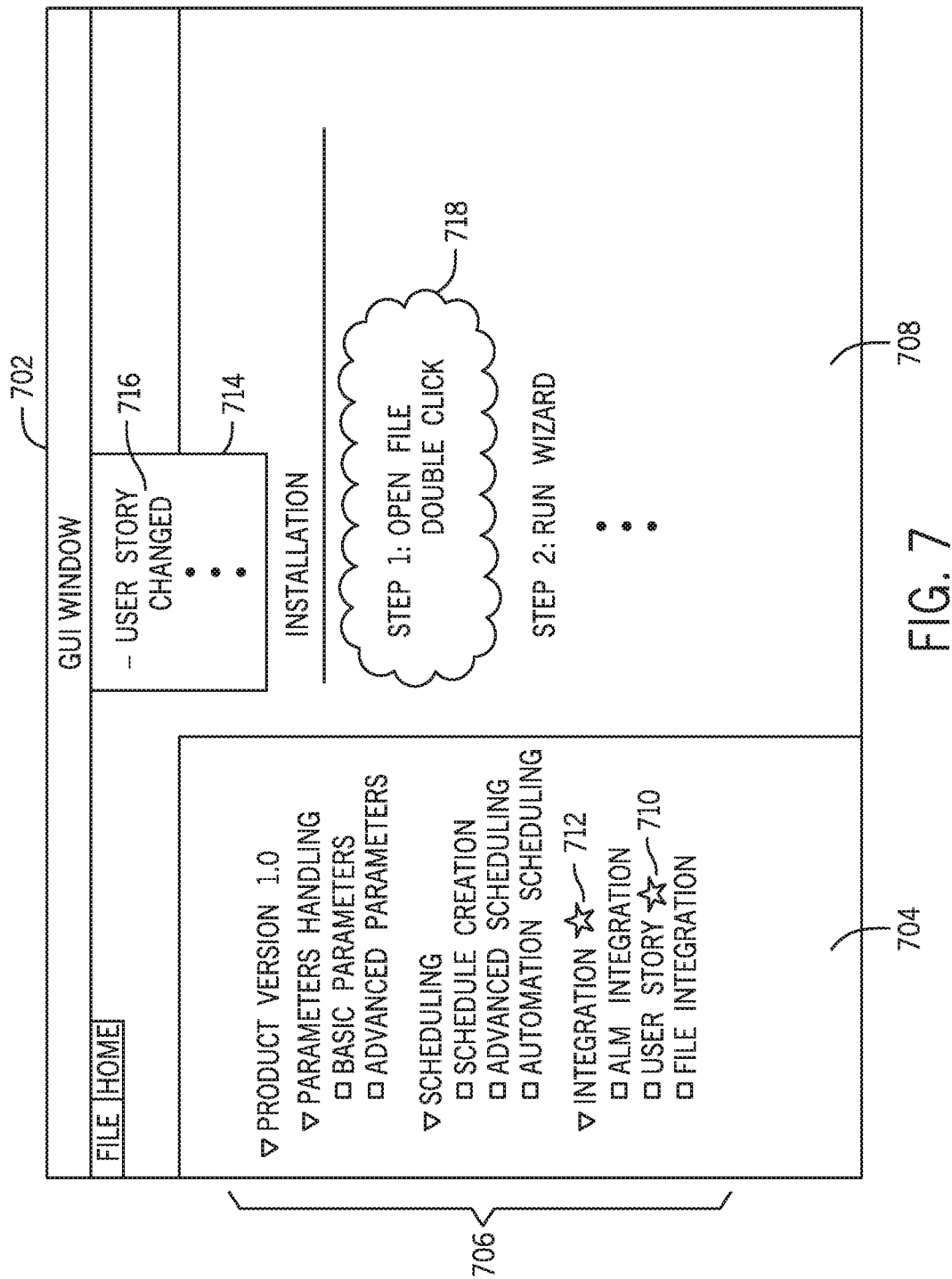

FIG. 7 shows another example GUI window 702, has a display area 704 that shows a tree 706 similar to the tree 606 in FIG. 6. The GUI window 702 also has a document display area 708 that shows a portion of a document (similar to that shown in FIG. 2). In the example of FIG. 7, it is also assumed that the user story entity has been modified, as indicated by marker 710. As in FIG. 6, another marker 712 can also be added adjacent the Integration item that is the parent of the User Story item.

In FIG. 7, modification of the user story entity causes a dialog box 714 to be displayed. The dialog box 714 includes information 716 indicating that the user story entity has changed. In addition, the document display area 708 displays the document (portion) that is affected by the change to the user story entity.

In examples where multiple entities relating to product development are changed, the dialog box 714 can include information identifying the multiple changed entities.

A user can use the information in the dialog box 714 to make corresponding changes to the text of the document displayed in the document display area 708, in some examples. In some examples, a portion of the document displayed in the document display area 708 can also be highlighted, such as 718. The highlighted portion 718 identifies the portion of the document that is affected by the change to the user story entity.

By using techniques or mechanisms according to some implementations, links between entities relating to product development and documents (or document portions) can be easily created. As an example, a user would no longer have to search for information and ask other users of a project regarding how changes made to an entity would affect documents, or vice versa.

As a result, more accurate documents can be produced for a product under development. Additionally, an alert can be generated whenever a change occurs so that appropriate further changes can be made.

Figure 8:
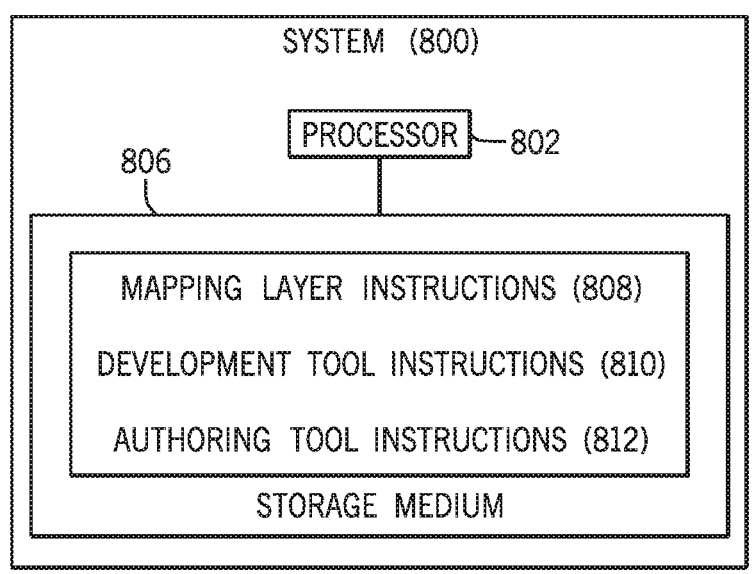
FIG. 8 is a block diagram of an example system according to some implementations.

FIG. 8 is a block diagram of a system according to some implementations. The system 800 can include a computer system, which can include a computer or an arrangement of computers. The system 800 includes a processor (or multiple processors) 802. The processor(s) 802 can be coupled to a network interface 804 to allow the system 800 to communicate over a network. A processor can include a microprocessor, microcontroller, physical processor module or subsystem, programmable integrated circuit, programmable gate array, or another physical control or computing device.

The processor(s) 802 can also be coupled to a non-transitory computer-readable or machine-readable storage medium (or storage media) 806, which can store computer-readable instructions. The computer-readable instructions can include mapping layer instructions 808, which correspond to instructions of the mapping layer 310 shown in FIG. 3. In addition, the computer-readable instructions can include development tool instructions 810 (which are instructions of the development tool 302) and authoring tool instructions 812 (which are instructions of the authoring tool 306).

Although the mapping layer instructions 808, development tool instructions 810, and authoring tool instructions 812 are shown as being part of one system 800, it is noted that in other examples, these instructions can run in separate systems.

The storage medium (or storage media) can be implemented with one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   causing, by a processor of a system, a display of a hierarchical representation of entities associated with a development of a product and a document including portions describing features of the product;
   receiving, by the processor, a selection of one entity in the hierarchical representation of entities;
   in response to the selection of the entity in the hierarchical representation of entities and a particular portion of the document was selected, creating, by the processor, a link between the selected entity in the hierarchical representation of entities and the particular portion of the document; and
   in response to the selection of the entity in the hierarchical representation of entities and no portion of the document was selected, creating, by the processor, a link between the selected entity in the hierarchical representation of entities and an entirety of the document.

2. The method of claim 1, further comprising:
   in response to receiving the selection of the entity in the hierarchical representation, causing a display of a marker adjacent to the entity to indicate that the entity has been selected.

3. The method of claim 2, wherein the marker to indicate that the entity has been selected includes a check mark displayed in a user-selectable box adjacent to the entity.

4. The method of claim 1, further comprising:
   in response to receiving the selection of the entity in the hierarchical representation, causing a display of a first marker adjacent to the entity to indicate that the entity has been selected and a second marker adjacent to a parent entity of the entity in the hierarchical representation of entities.

5. The method of claim 1, further comprising:
   detecting a change in the entity linked to the particular portion of the document; and
   in response to detecting the change in the entity, generating an alert output that identifies the change in the entity and the particular portion of the document affected by the change.

6. The method of claim 5, further comprising causing a modification of the particular portion of the document in response to detecting the change in the entity.

7. The method of claim 1, further comprising:
   detecting a change in the particular portion of the document; and in response to detecting the change in the particular portion of the document, generating an alert output that shows the change in the particular portion of the document and that identifies the entity affected by the change in the particular portion of the document.

8. The method of claim 1, wherein the development of the product uses a development tool, and the document is created using an authoring tool, the method further comprising:
providing a mapping layer connected between the development tool and the authoring tool, wherein the mapping layer performs the causing of the display of the hierarchical representation of entities and the document, the receiving of the selection of the entity, and the creating of the link between the selected entity and the particular portion of the document or the link between the selected entity and the entirety of the document.

9. The method of claim 8, wherein the mapping layer includes a plug-in code to plug into one or both of the development tool and the authoring tool to create the link between the entity in the hierarchical representation of entities and the particular portion of the document.

10. The method of claim 1, further comprising delivering, by an enterprise to a customer, the product along with the document.

11. An article comprising a non-transitory computer-readable storage medium storing instructions that upon execution cause a system to:
cause a display, on a graphical view, of a tree representing a hierarchical representation of entities associated with a development of a product and a document including portions describing features of the product;
receive a selection of one entity in the hierarchical representation of entities;
in response to the selection of the entity in the hierarchical representation of entities and a particular portion of the document was selected, create a link between the selected entity in the hierarchical representation of entities and the particular portion of the document; and
in response to the selection of the entity in the hierarchical representation of entities and no portion of the document was selected, create a link between the selected entity in the hierarchical representation of entities and an entirety of the document.

12. The article of claim 11, wherein the instructions upon execution cause the system to further:
detect a change in the entity linked to the particular portion of the document; and
in response to detecting the change in the entity, generate an alert output highlighting the particular portion of the document affected by the change in the entity.

13. The article of claim 12, wherein the alert output further comprises information indicating the change in the entity.

14. The article of claim 11, wherein the instructions upon execution cause the system to further:
in response to detecting a change in the particular portion of the document, generate an alert output that shows the change in the particular portion of the document and that identifies the entity affected by the change in the particular portion of the document.

15. The article of claim 11, wherein the instructions upon execution cause the system to further:
in response to receiving the selection of the entity in the hierarchical representation of entities, display a check mark in a user-selectable box adjacent to the entity to indicate that the entity has been selected.

16. A system comprising: a processor and a memory storing instructions that when executed cause the processor to:
cause a display, on a graphical view, of a hierarchical representation of entities associated with a development of a product and a document including portions describing features of the product;
receive a selection of one entity in the hierarchical representation of entities;
in response to the selection of the entity in the hierarchical representation of entities and a particular portion of the document was selected, create a link between the selected entity in the hierarchical representation of entities and the particular portion of the document; and
in response to the selection of the entity in the hierarchical representation of entities and no portion of the document was selected, create a link between the selected entity in the hierarchical representation of entities and an entirety of the document.

17. The system of claim 16, further comprising a development tool to develop the product, an authoring tool to create the document, and a mapping layer connected between the development tool and the authoring tool, the mapping layer to perform the causing of the display of the hierarchical representation of entities and the document, the receiving of the selection of the entity, and the creating of the link between the selected entity and the particular portion of the document or the link between the selected entity and the entirety of the document.

18. The system of claim 16, wherein the instructions are executable to cause the processor to:
detect a change in the entity linked to the particular portion of the document; and
in response to the change in the entity, generate an alert output showing the change in the entity and identifying the particular portion of the document affected by the change in the entity.

19. The system of claim 16, wherein the instructions are executable to cause the processor to:
detect a change in the entity linked to the particular portion of the document; and
in response to the change in the entity, update the particular portion of the document affected by the change in the entity.

20. The system of claim 16, wherein the instructions are executable to cause the processor to:
in response to detecting a change in the particular portion of the document, generate an alert output that shows the change in the particular portion of the document and that identifies the entity affected by the change in the particular portion of the document.

* * * * *